UNITED STATES PATENT OFFICE.

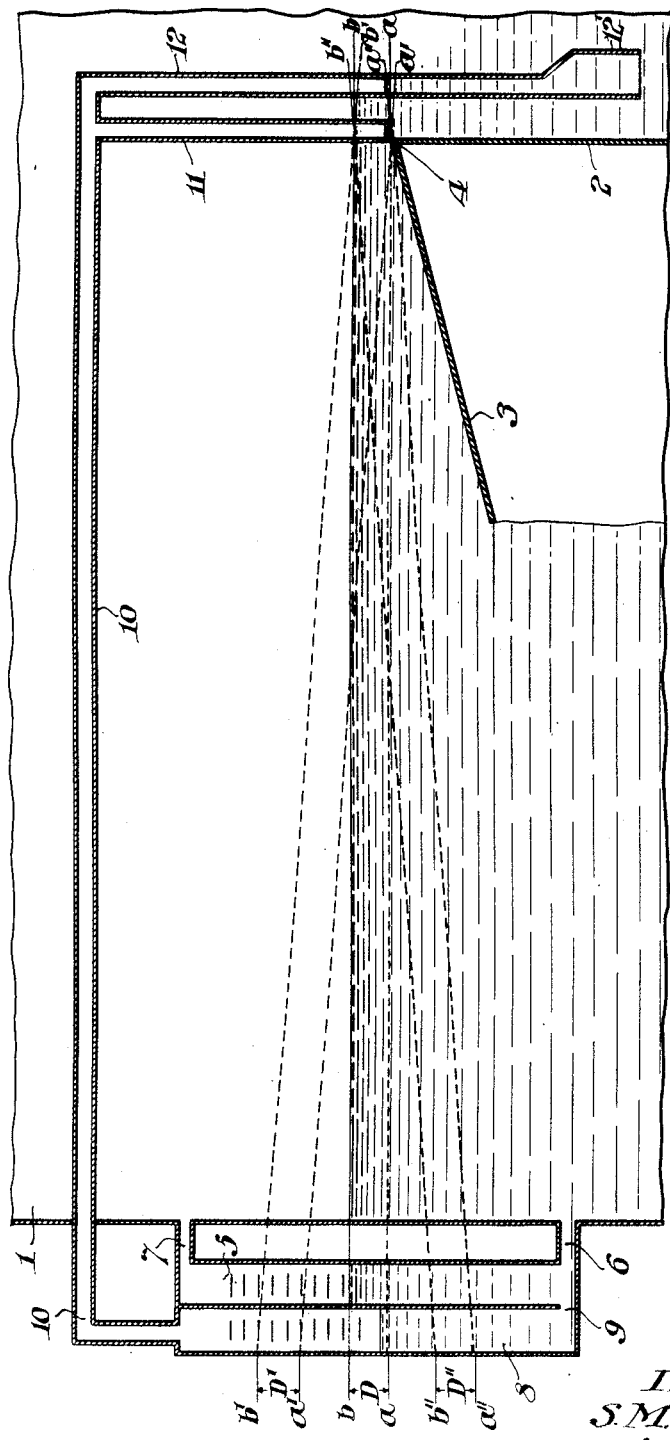

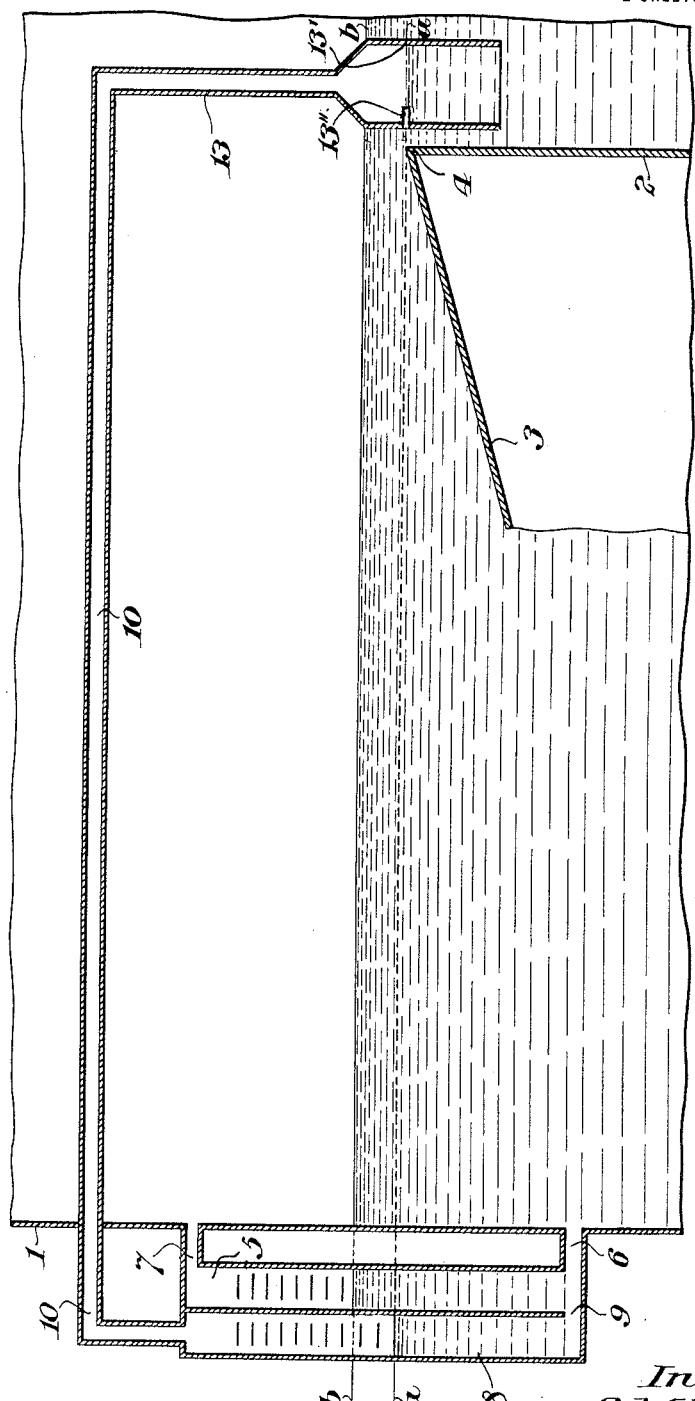

SYLVESTER M. VIELE, OF ALTOONA, PENNSYLVANIA.

METHOD AND MECHANISM FOR MEASURING FLUID DEPTHS.

1,352,565.   Specification of Letters Patent.   Patented Sept. 14, 1920.

Application filed January 22, 1918. Serial No. 213,120.

*To all whom it may concern:*

Be it known that I, SYLVESTER M. VIELE, a citizen of the United States, residing at Altoona, in the county of Blair and State of Pennsylvania, have invented a certain Method and Mechanism for Measuring Fluid Depths, of which the following is a specification.

This invention is intended primarily for measuring water in boilers, and it is designed especially for determining the depth of water in locomotive boilers, but it will be understood that it is applicable to other uses.

In locomotive boilers, particularly of the length now commonly used, there is great uncertainty in determining the relation of the water level to the heated surfaces, when operating on grades, and this determination has been largely dependent upon the judgment of the operative, with liability to error.

It is the leading object of my invention to effect a definite indication of the depth of water at a desired point within the boiler regardless of the grade and interpolate therefrom the depths at different points with a minimum liability to error.

This object is attained in the present form of my invention by the combination with the gage for showing the level of water in the boiler, of a juxtaposed differential gage having connections for obtaining a column of water therein having the level of the point within the boiler, as the top of the crownsheet, the submergence of which is to be determined, so that the difference of levels shown by the gages will be the depth of submergence of such point, this second gage having a direct connection with the water in the boiler, an indirect connection therewith at the level of the submerged datum point through trapped gas or steam, and means for providing such gas or steam under pressure between the surfaces of the water thus connected, with resulting capacity for depressing the water in such connections to the level of the submerged point.

The nature and characteristic features of my improvements are fully disclosed in the following description and the accompanying drawings in illustration of forms thereof.

In the drawings, Figure 1 represents diagrammatically the application of my invention to a boiler, having its parts unnecessary to the description broken away; and Fig. 2 represents diagrammatically a modification of the construction shown in Fig. 1.

The mechanism comprises the boiler 1 containing the tube sheet 2 and the crown sheet 3, the junction 4 of which will be considered here as substantially coincident with the center of flotation and the point of submergence whose depth is to be determined. The gage glass or reading column 5 at the rear end of the boiler is connected at its bottom by the conduit 6 with the water space and at its top by the conduit 7 with the steam space of the boiler.

The gage glass or reading column 8, adjacent to the gage 5, is connected at its bottom by the conduit 9 with the column 5 and therethrough with the conduit 6 communicating with the water space of the boiler, and at its top with a tube 10 which passes through the steam space of the boiler.

As illustrated in Fig. 1, this tube has a branch or section 11 with an open terminus adjacent to the junction 4 at the level of the top of the crown sheet and a branch 12 with an enlarged open terminus or steam collecting chamber 12' below the crown sheet.

As the glass or reading column 5 has free communication by the conduits 6 and 7 with the water and steam spaces of the boiler, the level of water in such gage will be the level of water in the boiler.

As the glass or reading column 8 has free communication at its bottom by the conduits 9 and 6 with the water space in the boiler, and as the passage 10 from the top thereof is sealed by the submergence of the open ends of its branches 11 and 12, the level of water in this gage will depend on the pressure of the elastic fluid confined above it. The pressure of the elastic fluid in the conduit 10 is caused to be superior to that of the steam in the boiler exterior thereto, which may result from the admission of gas to the conduit under the desired pressure either from an outside source or through steam collected by the submerged chamber 12' and subject to a consequent hydrostatic head. Consequently the water in the column 8 and the tube 11 will be depressed to a level below that of the general level in the boiler at all times when the tube 11 is sealed. When substantially all the water is forced out of the tube 11, the difference between the levels of water in the columns 5 and 8 will be the depth of water over the highest point of the crown sheet, and when the level of water in the two columns is the same the top of the crown sheet is uncovered or substantially so, regardless of the grade influencing the position of the boiler.

If line $a—a$ be the level of the top of the crown sheet and $b—b$ be the level of the water, when the boiler is level or the grade is zero, then the depth of water above the crown sheet will be the distance D, which will be shown by the difference in reading of the two columns 5 and 8 when the water is driven out of the tube 11. If the locomotive is standing on or moving upon an ascending grade, so that the level of the datum or top of the crown sheet bears the relation thereto of the line $a'—a'$, then the water level will be represented by the line $b'—b'$ and the depth of water at the top of the crown sheet will be the distance between these two lines or D', equal to D, which will again be shown by the difference in the reading of the two columns when the pressure within the tube 11 breaks its seal. If the locomotive be on or moving down a grade, so that the level of the datum or top of the crown sheet bears the relation thereto of line $a''—a''$, then the water level will be represented by the line $b''—b''$, and the depth of the water at the top of the crown sheet will be the distance between these lines or D'', equal to D, which will again be shown by the difference in the reading of the two columns when the seal of the tube 11 is broken by pressure therein.

It will be understood therefore that a difference in the reading of the two columns will show that the crown sheet is covered and, by forcing the water out of the tube 11, the depth to which it is covered.

As illustrated in Fig. 2, the conduit 10 has a branch or section 13 having at the lower end thereof a steam collecting chamber 13' with an open bottom disposed below the highest point 4 of the crown sheet, the chamber containing an aperture 13'' at the level of the point 4.

Here, as previously described, steam rises in the collecting chamber 13' and is trapped, between the water therein and in the tube 8, in the conduit 10—13; the trapped steam depressing the surfaces of the water in contact therewith below that of the general level in the boiler and a difference in the readings of the columns 5 and 8 will show that the crown sheet is covered.

When the pressure of the trapped steam forces the water level in the chamber 13' down to the aperture 13'', the differences in the readings of the columns 5 and 8 will show the depth of water above the highest point of the crown sheet in the different positions of the locomotive, and when the water in the boiler falls to the level of the top of the crown sheet this will be shown by the water columns in the tubes 5 and 8 having the same level.

Since the conduits connected with or forming part of the differential gage are disposed in great part within the boiler, there is very little tendency to condensation or leakage, and any leakage within the boiler will be induced by a comparatively low pressure having very little tendency to interfere with the operation of the device.

Having described my invention, I claim:

1. In the determination of the depth of liquid above a datum point in a compartment having a gage for showing the level of liquid therein and a differential gage comprising a conduit having connected apertures adapted to be sealed by said liquid, the method which consists in sealing said apertures and providing liquid columns in said gages by liquid in said compartment and providing fluid pressure in said conduit superior to that in said compartment and thereby depressing the liquid level in said differential gage below the liquid level in said gage first named.

2. In the determination of the depth of water with relation to a datum point in a boiler having a gage for showing the level of water therein and a differential gage comprising a conduit having connected apertures at different levels adapted to be sealed by water in said conduit, the higher of said apertures being in proximity to said point the method which consists in providing water columns in said gages and sealing said apertures by water in said boiler, producing steam in said boiler and collecting in said differential gage steam aforesaid and thereby depressing the water level therein relatively to the water level in said gage first named.

3. In a gage, the combination with means for showing the level of a liquid in a compartment, of means for showing the relation of a datum point within said compartment to said level, said means second named comprising a conduit having apertures at different levels adapted to be sealed by said liquid.

4. In a gage, the combination with a boiler of means comprising a reading column for showing the level of water in said boiler, means for showing the distance beneath said level of a heating surface of said boiler, said means second named comprising a conduit having a reading column in juxtaposition to said column first named and an aperture adapted to be sealed by water in said boiler, and means for providing fluid pressure in said conduit superior to the pressure exterior thereto.

5. In a gage, the combination with a boiler, of a reading column, means by which water can flow from said boiler into said column, a conduit passing through the steam space of said boiler and connecting said column with the water space thereof, and means for applying within said conduit fluid pressure adapted for depressing the water in said column.

6. In a gage, the combination with a boiler, of means for showing the level of water in said boiler, and means for showing a differential level in said boiler, said means second named comprising a conduit having apertures communicating with the water space of said boiler at different levels.

7. In a gage, the combination with a boiler, of means comprising a tube for showing the level of water in said boiler, and means comprising a second tube for showing a different level in said boiler, a conduit communicating with said second tube and with the water space of said boiler, and a steam collection chamber connecting the water space of said boiler with said conduit for supplying pressure within said second tube superior to the steam pressure of said boiler.

8. The combination with a locomotive boiler, of means comprising a glass for showing the water level in said boiler, and means comprising a glass for showing the level of the top of the crown sheet, said means second named comprising a conduit having an opening disposed in proximity to the top of said crown sheet and the center of flotation of said boiler.

9. The combination with a compartment adapted for holding a boiling liquid, of a differential gage comprising a plurality of fluid containers provided with means connecting them with said compartment below the normal liquid level therein to show simultaneously different levels in said compartment, and means for automatically utilizing the pressure developed by boiling said liquid to regulate the relative levels of the liquid in said containers and indicate the depth of the liquid in said compartment above a datum.

10. The combination with a compartment adapted for holding a boiling liquid, of a differential gage comprising containers provided with means for connecting them with said compartment below the normal liquid level therein to show the depth of liquid in said compartment above a datum, one of said containers provided with means for connecting it with said compartment above the normal liquid level therein and the other of said containers provided with means for subjecting the liquid therein to pressure developed by the boiling liquid superior to that in the one first named.

In testimony whereof I have hereunto set my name this 19th day of January, 1918.

SYLVESTER M. VIELE.